United States Patent [19]

Westendorf

[11] 4,314,711
[45] Feb. 9, 1982

[54] GAS CUSHION APPARATUS

[75] Inventor: Gail F. Westendorf, Decatur, Ill.

[73] Assignee: Caterpillar Tractor Co., Peoria, Ill.

[21] Appl. No.: 89,778

[22] PCT Filed: Jul. 2, 1979

[86] PCT No.: PCT/US79/00472

§ 371 Date: Jul. 2, 1979

§ 102(e) Date: Jul. 2, 1979

[51] Int. Cl.³ .............................................. B62B 9/16
[52] U.S. Cl. ............................... 280/154; 188/322.50;
248/631; 296/198
[58] Field of Search .................. 180/902, 89.12, 89.13;
280/153 R, 153 A, 154, DIG. 1; 308/DIG. 1;
248/631; 52/2; 296/35.1, 190, 198; 188/1 B;
267/65 R, 65 D, DIG. 1, DIG. 2

[56] References Cited

U.S. PATENT DOCUMENTS

| | | | |
|---|---|---|---|
| 1,699,572 | 1/1929 | Scheid | 289/153 R |
| 1,824,997 | 9/1931 | Howard | 280/153.5 |
| 2,450,958 | 10/1948 | Hayes | 280/154 |
| 2,634,138 | 4/1953 | Zabel | 280/153 A X |
| 2,985,114 | 5/1961 | Lindner | 308/DIG. 1 |
| 3,157,240 | 11/1964 | Chew | 180/69 C |
| 3,760,899 | 9/1973 | Crossman et al. | 180/125 |
| 3,841,694 | 10/1974 | Merkle | 280/702 X |
| 3,966,009 | 6/1976 | Meacock et al. | 280/712 X |
| 4,014,533 | 3/1977 | Krejcir et al. | 248/631 X |

FOREIGN PATENT DOCUMENTS 1944185  3/1978  Fed. Rep. of Germany ...... 248/631
925269   5/1963  United Kingdom ......... 308/DIG. 1

OTHER PUBLICATIONS

Mount for Vibration Sensitive Equipment, R. A. Leonard, IBM Technical Disclosure Bulletin, vol. 9, No. 9, 2/9/67.

Primary Examiner—Joseph F. Peters, Jr.
Assistant Examiner—Donald W. Underwood
Attorney, Agent, or Firm—Charles E. Lanchantin, Jr.

[57] ABSTRACT

A gas cushion apparatus (10) includes first, second and third members (14,16,21) and with the first and second members (14,16) being connected together, and constructed such that the second member (16) is capable of being excited by vibration of the first member (14). A cushion device (20) controllably distributes a gas between the second member (16) and one of the first and third members at a preselected region (80) and reduces the transmission of vibratory forces from the second member (16) into one of the first and third member (14,21). The apparatus is particularly applicable to supporting a fender on a wheeled vehicle and minimizing noise transmission to an operator's compartment.

13 Claims, 3 Drawing Figures

GAS CUSHION APPARATUS

DESCRIPTION

1. Technical Field

The present invention relates to a gas cushion apparatus, and particularly to controllably providing a gas cushion between first and second members for reducing the transmission of vibratory forces from the second member to the first member.

2. Background Art

Vibration isolation in vehicles, for example, is most often attempted by placing elastomeric or rubber pads, straps or bushings between the members to be isolated. Such rubber mounts have significantly reduced transmission of vibration across the associated connecting joints, and are particularly useful at the higher range of disturbing frequencies.

However, when the vibrating member has a small mass and vibrates at a relatively low range of frequencies, for example less than about 60 cycles per second, rubber mounts become less desirable. Specifically, very soft rubber and large deflections are required. Soft rubber, 30 Durometer of less, is more expensive than hard rubber and the physical properties thereof are less consistent. These characteristics make the mount or resulting joint bulky and loose in all planes at all times.

A particularly vexing problem that has been experienced with vehicles is the transmission of vibration from the fenders or other formed sheet material back to the operator's compartment, which large mass compartment is otherwise reasonably well isolated from the vehicle main frame. The fenders have a low mass, and are excited by main frame vibration at a low range of frequencies from about 5 to 60 cycles per second with operation of the vehicle. Unfortunately, there is minimal space for rubber mounts, and even if they would be utilized they would not be as effective as desired under these conditions.

DISCLOSURE OF INVENTION

In accordance with one aspect of the present invention a gas cushion apparatus includes a first, second and third members, the second member being connected to the first member and exhibiting a tendency to vibrate, and a cushioning device for controllably distributing a gas between the second member and one of the first or third members at a preselected region to reduce the transmission of induced vibration or noise away from the second member into one of the first and third members.

In another aspect of the invention a gas cushioning device is provided for controllably distributing a gas between the juxtaposed facing surfaces of first and second vehicle members in order to reduce the transmission of induced vibratory forces from the second member to the first member.

In still another aspect of the present invention a fender is connected to a vehicle support frame and a cushioning device is provided for controllably distributing a gas to a preselected region located between the fender and another member to reduce the transmission of vibratory forces to the another member. Advantageously, the fender is at least partially supported by the gas emanating upwardly from a plurality of openings in a housing.

BEST MODE FOR CARRYING OUT THE INVENTION

Figure 1:
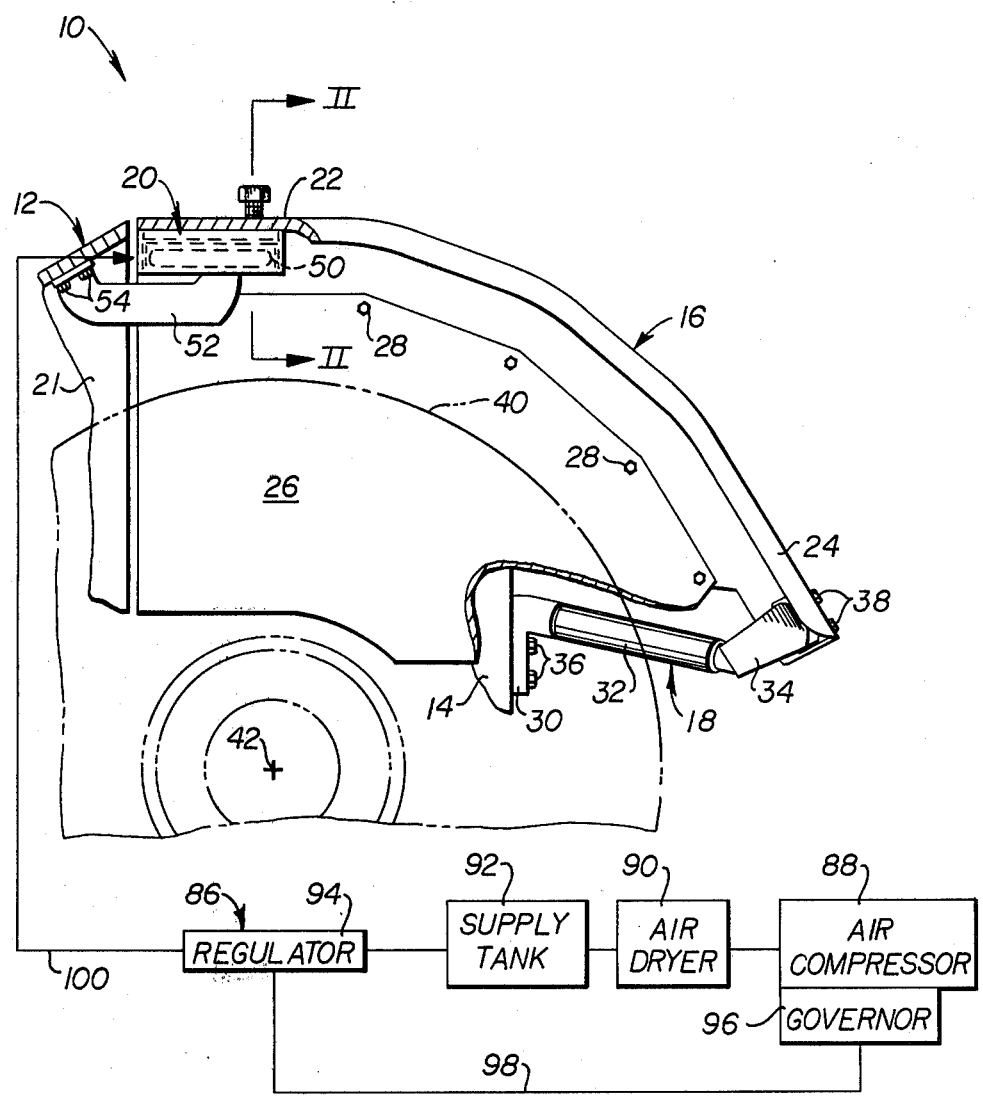
FIG. 1 is a diagrammatic, elevational side view of a fragmentary portion of a vehicle having a fender supported in accordance with the gas cushion apparatus of the present invention, and showing in block diagram form a gas supply source therefor.
Figure 2:
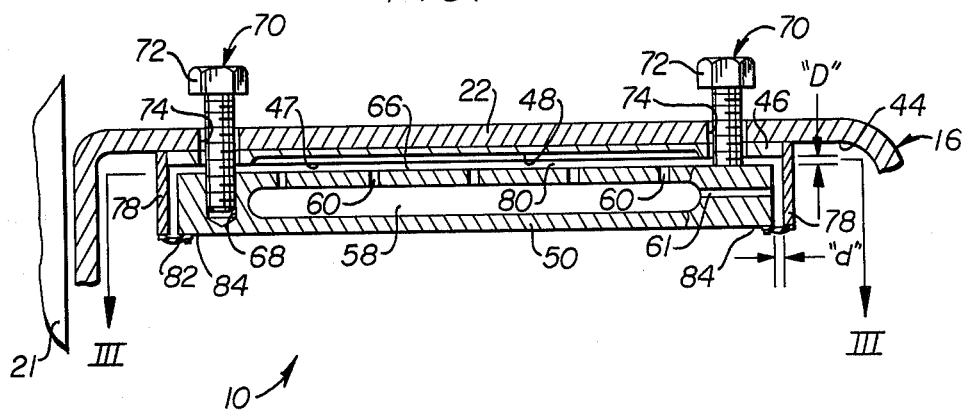
FIG. 2 is an enlarged, diagrammatic, transverse cross sectional view of the apparatus of the present invention as taken along line II—II of FIG. 1.
Figure 3:
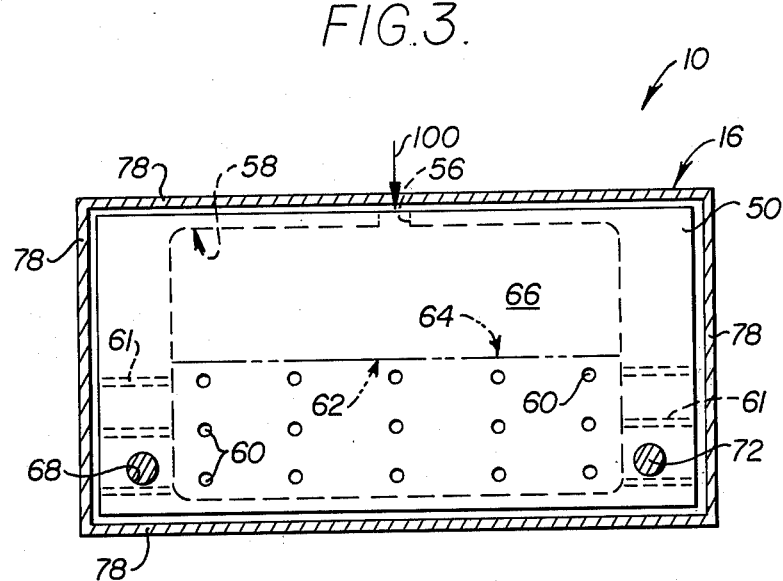
FIG. 3 is a diagrammatic, plan view of a portion of the apparatus shown beneath the fender as taken along line III—III of FIG. 2.

In the embodiment of the invention illustrated in FIGS. 1–3, a gas cushion apparatus 10 is disclosed in conjunction with a wheeled vehicle 12. As best shown in FIG. 1, a first member or relatively rigid support frame 14 of effectively large mass is mounted on the vehicle, and a second member or fender 16 of formed sheet material is connected to the support frame as by a relatively stiff support bracket 18. In use, or during operation of the vehicle, vibrations in the support frame cause the relatively thin fender to undesirably oscillate, and in accordance with the present invention a cushioning device 20 is provided to reduce the transmission of vibratory forces and/or noise from the relatively small mass fender into an element of the vehicle where it can be annoying to the operator. In the instant example, the cushioning device 20 substantially eliminates the transmission of vibratory forces from the fender 16 into a separate third member or operator's compartment 21 which is otherwise substantially isolated from the vehicle support frame 14.

The fender 16 has a front end 22 and a rear end 24, and is connected to a side plate or inner shield assembly 26 as by a plurality of releasable fasteners 28. The support bracket 18 includes a front mounting flange 30, an intermediate connecting tube 32 connecting to the flange and extending rearwardly and laterally outwardly, and a rear mounting flange 34 connected to the tube and extending laterally outwardly beneath the rear end 24 of the fender. The front flange 30 is releasably secured to the support frame 14 by a plurality of fasteners 36, and the rear flange 34 is releasably secured to the fender by a plurality of fasteners 38. Thus, the rear portion of the fender is secured to the support frame of the vehicle in typically overlapping proximity to a tire 40 connected to the vehicle frame for rotation about an axis 42, and with the support bracket allowing limited partial and deflective movement of the front end of the fender relative to the rear end thereof.

The cushioning device 20 is advantageously located at the front end 22 of the fender 16, and in use supports through a gas such as air or exhaust fumes at least a portion of the total weight of the fender and the associated shield assembly. In the instant example, the fender weighs about 91 Kg (200 lbs.) and the shield assembly weighs about 23 Kg (50 lbs.), and the fender has an internal, relatively planar lower surface 44 of about 0.75 m (30") lateral width as shown best in FIG. 2 at the front end thereof, so that it can be appreciated that the fender is of substantial size for use in a large wheeled tractor, truck or the like. A relatively flat pad 46 of resilient elastomeric material or nonabrasive plastic material such as polytetrafloroethylene polymer, is secured to the lower surface of the fender, and it can be noted that the pad has a bottom planar surface 47 and a downwardly facing pocket 48 therein.

The cushioning device 20 includes a hollow housing 50 releasably connected to the operator's compartment 21 via a bracket 52 and a plurality of fasteners 54 as illustrated in FIG. 1. As shown best in FIG. 3, the housing defines an inlet passage 56, an internal chamber 58, and a plurality of vertical and horizontal outlet openings 60 and 61 in communication with the chamber. In a desirable manner the internal chamber is divided into an inlet diffuser portion 62 and an outlet exhaust portion 64. The housing further has a planar upper surface 66 and a plurality of threaded blind bores 68 opening on the upper surface, and positively acting guide and retaining means 70 is provided to assure controlled movement of the front end 22 of the fender 16 relative to the operator's compartment 21. Particularly, the guide and retaining means 70 includes a plurality of headed guide bolts 72 screw-threadably received in the threaded bores in the housing, and which bolts pass through a corresponding plurality of openings 74 through the fender and the pad 46.

A plurality of depending planar reaction members or plates 78 are secured to the fender 16, or alternately can be constructed as an integral part of the fender, in order to provide a reaction surface for the gas emenating from the chamber opening 61 in the lateral direction, and for better containment of the gas in a preselected pressure region 80 generally located intermediate the fender and the housing 50. A plurality of flexible seals or skirt members 82 are preferably releasably connected to a peripheral lower surface portion 84 of the housing by rivets, fasteners or the like for low force engagement against the plates 78 to reduce the flow of gas away from the preselected pressure region for conservation and economic reasons. It is to be understood that a large number of conventional seal arrangements can be utilized between the housing and the plates without departing from the spirit of the present invention, it only being necessary that such a seal arrangement have negligible effect on the relative motion of the fender.

Referring now to FIG. 1, a pressurized air source 86 is shown as including a vehicle operated air compressor 88, an air dryer 90, a supply tank 92, and a regulator 94 in serially connected order, and a governor 96 for controlling the operation of the air compressor in response to a signal in a conduit 98 from the regulator. The regulator communicates air at relatively low pressure to the chamber 58 in the housing 50 via a conduit 100, for example at a preselected fixed pressure level between about 30 kPa and 120 kPa (5 and 20 psi).

INDUSTRIAL APPLICABILITY

In operation of the vehicle 12, the engine drive compressor 88 supplies pressurized air to the cushioning device 20. The compressor is controlled by the governor 96 which receives an input control signal via the conduit 98. The air passes through the air dryer 90 which removes moisture, and then to the supply tank 92 which stores the compressed air to prevent the air compressor from having to run continuously. The regulator monitors and controls the flow rate of air from the supply tank to the conduit 100 leading to the housing 50, and preferably maintains the conduit 100 and essentially the internal chamber 58 at a preselected pressure level, for example 60 kPa (10 psi).

The pressurized air enters the inlet diffuser portion 62 of the chamber 58 where it is uniformly accumulated prior to passing on to the exhaust portion 64. The air passes upwardly from within the exhaust portion of the chamber via the vertical openings 60 to impinge upon the pocket 48 and to cause a pressure rise in the preselected pressure region 80 generally disposed intermediate the fender 16 and the housing 50. Accordingly, the facing surfaces 47 and 66 of the pad 46 and housing separate from a first position of contact to maintain a second position corresponding generally to a preselected gap or vertical distance "D" therebetween as is indicated at the right side of FIG. 2, and with the pocket 48 serving to stabilize the vertical flotation of the front end 22 of the fender relative to the housing 50 or to the operator's compartment 21.

Simultaneously, air passes outwardly from the chamber 58 through the transversely oriented horizontal openings 61 to impinge upon the opposite inner and outer longitudinally oriented reaction members or plates 78 and to thus tend to laterally center the fender on the housing 50. In this way a preselected gap or lateral distance "d" is generally maintained between the fender, and in effect the operator's compartment 21, as is indicated at the right portion of FIG. 2. By this centering action the guide bolts 72 are maintained in spaced apart relation from the fender 16 and pad 46 so that vibratory forces are not transmitted from the fender, into the housing. However, if the vehicle traverses a severe bump, the heads of the guide bolts will serve to limit movement of the front end of the fender to a third or maximum elevated position relative to the housing. It is comtemplated that resilient grommets or pads, not shown, can be mounted between the head of each of the guide bolts and fender to cushion the shock of stopping such upward movement of the fender.

During vehicle traverse over a large bump the front end of the fender 16 can also move downwardly to momentarily result in the contact of the juxtaposed surfaces 47 and 66. Under such circumstances I contemplate that the pad 46 can be sufficiently soft enough to minimize noise transmission into the housing 50.

Thus, even though vibratory forces can be transitted from the main support frame 14 into the fender 16 via the metal-to-metal connecting support bracket 18 at the rear end 24, the cushioning device 20 at the first end 22 substantially eliminates transmission of vibratory forces from the fender into the operator's compartment 21. In use, the pressurized gas in the region 80 supports the weight of the front end of the fender and the front end of the associated shield assembly 26 and prevents direct metal-to-metal contact with the operator's compartment 21 and/or the housing 50. Advantageously, the cushioning device takes up less space than a comparable rubber mount and provides a firm support where the vehicle is not being operated. For example, when there is no pressurized gas in the region 80 then the juxtaposed surfaces 47 and 66 contact one another due to gravity and the limited pivotal movement of the fender and shield assembly about the front mounting flange 30.

I also recognize that the housing 50 can be connected to the support frame 14 rather than to the third member or operator's compartment 21 as is illustrated. In either instance, the cushioning device 20 can serve to lower the excitation frequency of vibration of the fender 16 or equivalent formed sheet material. With such alternate construction the direct feedback of induced vibratory forces in the sheet material into the much larger mass of the support frame can be greatly reduced. However, the cushioning device must be operationally connected to the sheet material at a location spaced away from its positive metal-to-metal connection to the vibrating support frame, and must include a preselected gas region (80) between the sheet material 16 and at least one of the support frame 14 and operator's compartment 21 in order to reduce the transmission of induced vibratory forces from the sheet material into one of them.

Other aspects, objects and advantages of this invention can be obtained from a study of the drawings, the disclosure and the appended claims.

I claim:

1. A gas cushion apparatus (10) for a vehicle (12), comprising:
   a vehicle structural member (14) having a relatively large effective mass that vibrates in use;
   a vehicle fender (16) connected to the structural member (14) and being of a construction sufficient for vibrating at less than about 60 cycles per second with operation of the vehicle;
   another member (21); and
   cushion means (20) for controllably distributing a gas to a preselected region (80) between the fender (16) and the another member (21) and reducing the transmission of vibratory forces from the fender (16) into the another member (21).

2. The gas cushion apparatus (10) of claim 1 wherein the another member (21) includes an operator's compartment (21) and the cushion means (20) reduces the transmission of vibratory forces from the fender (16) to the operator's compartment.

3. The gas cushion apparatus (10) of claim 1 including a support bracket (18) and wherein the fender (16) has first and second ends (24,22), said first end (24) being connected to the structural member (14) through the support bracket (18), and said second end (22) being supported on the another member (21) by the cushion means (20).

4. A gas cushion apparatus (10) comprising:
   a first member (14) that vibrates in use;
   a second member (16) connected to the first member (14), the second member (16) being excited by vibration of the first member (14);
   a third member (21); and
   cushion means (20) for continually and controllably distributing a gas to a preselected region (80) between the second member (16) and the third member (21) and reducing the transmission of vibratory forces from the second member (16) into the third member (21), the cushion means (20) including a housing (50) defining an internal chamber (58) including an outlet exhaust portion (64) having a plurality of generally vertical and horizontal outlet openings (60,61), the housing (50) being connected to the third member (21) and being of a construction sufficient for directing the gas outwardly from the openings (60,61) and continually against the second member (16), the cushion means (20) including flexible seal means (82) for partially containing the gas between the second and third members (16,21) during relative movement therebetween and inhibiting the flow of gas away from the preselected region (80).

5. A gas cushion apparatus (10) comprising:
   a vehicle support frame (14);
   a fender (16) connected to the frame (14);
   an operator's compartment (21); and
   cushion means (20) for controllably distributing a gas at a preselected region (80) between the operator's compartment (21) and the fender (16) and in use reducing the transmission of induced vibratory forces from the fender (16) to the operator's compartment (21).

6. The gas cushion apparatus (10) of claim 5 wherein the cushion means (20) includes a housing (50) having a plurality of openings (60) connected to the operator's compartment (21), the cushion means (20) directing the gas from the openings (60) to the pre-selected region (80) under the fender (16).

7. A gas cushion apparatus (10) comprising:
   a first member (14);
   a second member (16) of formed sheet material capable of being excited by vibration of the first member (14), the second member (16) having first and second portions (22,24), the first portion (22) having a first surface (47);
   a third member (50) defining a chamber (58), a second surface (66) in juxtaposed facing relation to the first surface (47), a plurality of generally vertically oriented openings (60) interconnecting the chamber (58) and the second surface (66), and a plurality of generally horizontally oriented openings (61) connected to the chamber (58);
   connecting means (18) for fixedly connecting and supporting the second member (16) on the first member (14) at the second portion (24) and allowing limited partial and deflective movement of the first portion (22) relative to the second portion (24); and
   means (86,100) for continually and controllably distributing a gas to the chamber (58) and outwardly therefrom through the vertically oriented openings (60) to a preselected region (80) between the surfaces (66,47) and reducing the transmission of vibratory forces from the second member (16) to one of the first and third members (14,50) and outwardly therefrom through the horizontally oriented openings (61) and laterally stabilizing the second member (16).

8. The gas cushion apparatus (10) of claim 7 wherein the second member (16) is a vehicle fender.

9. The gas cushion apparatus (10) of claim 7 wherein the juxtaposed surfaces (47,66) are generally horizontally oriented and the gas exits continually from the vertically oriented openings (60) and impinges generally upwardly against the second member (16) for at least partially supporting the second member (16).

10. The gas cushion apparatus (10) of claim 7 including flexible seal means (82) for inhibiting the flow of gas away from the preselected region (80) between the second and third members (16,50) during relative movement therebetween.

11. The gas cushion apparatus (10) of claim 7 including a plurality of depending reaction plates (78) connected to the second member (16), the gas exiting from the horizontally oriented openings (61) and impinging upon the reaction plates (78).

12. The gas cushion apparatus (10) of claim 11 including flexible seal means (82) connected to the third member (50) for low force sealing engagement with the reaction plates (78).

13. The gas cushion apparatus (10) of claim 7 including guide and retaining means (70) for positively limiting upward movement of the first portion (22) of the second member (16) relative to the third member (50).

* * * * *